United States Patent [19]

Fischer

[11] 4,444,995

[45] Apr. 24, 1984

[54] NON-BINDING CONDUCTOR LOAD BEARING ROLLER FOR A GAS-INSULATED TRANSMISSION LINE HAVING A CORRUGATED OUTER CONDUCTOR

[75] Inventor: William H. Fischer, Pittsburgh, Pa.

[73] Assignee: Westinghouse Electric Corp., Pittsburgh, Pa.

[21] Appl. No.: 439,248

[22] Filed: Nov. 4, 1982

[51] Int. Cl.³ ..................... H01B 9/06; H01B 9/04; H02G 5/06

[52] U.S. Cl. ..................... 174/28; 138/108; 174/14 R; 174/99 B

[58] Field of Search .............. 174/14 R, 16 B, 27, 174/28, 99 R, 99 B, 99 E; 138/108, 112, 113, 114; 339/1 R, 6 R, 6 RL, 9 R, 9 E

[56] References Cited

U.S. PATENT DOCUMENTS 4,328,391  5/1982  Cookson .................... 174/14 R

Primary Examiner—Laramie E. Askin
Attorney, Agent, or Firm—M. J. Moran

[57] ABSTRACT

A gas-insulated transmission line includes a corrugated outer conductor, an inner conductor disposed within and insulated from the outer conductor by means of support insulators and an insulating gas, and a non-binding transport device for supporting and permitting movement of the inner conductor/insulating support assembly axially along the corrugated outer conductor without radial displacement and for moving without binding along corrugations of any slope less than vertical. The transport device includes two movable contacts, such as skids or rollers, supported on a common pivot lever, the pivot lever being rotatably disposed about a pivot lever axis, which pivot lever axis is in turn disposed on the periphery of a support insulator or particle trap if one is used. The movable contacts are separated axially a distance equal to the axial distance between the peaks and valleys of the corrugations of the outer conductor and separated radially a distance equal to the radial distance between the peaks and valleys of the corrugations of the outer conductor. The transport device has the pivot lever axis disposed parallel to the motion of travel of the inner conductor/insulating support assembly.

2 Claims, 7 Drawing Figures $F_R$ = FORCE COMPONENT ALONG CORRUGATION SURFACE = $F_L \cos \alpha$ $F_L$ = LEVER FORCE LINE OF ACTION

NON-BINDING CONDUCTOR LOAD BEARING ROLLER FOR A GAS-INSULATED TRANSMISSION LINE HAVING A CORRUGATED OUTER CONDUCTOR

GOVERNMENT CONTRACT

The Government has rights in this invention pursuant to Contract No. ET-78-C01-2870 awarded by the U.S. Department of Energy.

CROSS-REFERENCE TO RELATED APPLICATIONS

This application is related to concurrently filed copending applications "Particle Trap To Sheath Contact For A Gas-Insulated Transmission Line Having A Corrugated Outer Conductor", Ser. No. 439,246, by W. H. Fischer, K. H. Yoon and A. H. Cookson, "Particle Trap To Sheath Non-Binding Contact For A Gas-Insulated Transmission Line Having A Corrugated Outer Conductor", Ser. No. 439,245, by W. H. Fischer, and "Conductor Load Bearing Roller For A Gas-Insulated Transmission Line Having A Corrugated Outer Conductor", Ser. No. 439,247, by W. H. Fischer and K. H. Yoon, all assigned to the same assignee as the present invention.

BACKGROUND OF THE INVENTION

1. Field of the Invention

The invention relates in general to gas-insulated transmission lines and in particular to a non-binding inner conductor load bearing roller for a gas insulated transmission line having a corrugated outer conductor.

2. Description of the Prior Art

Motion occurs between the inner conductor/insulating means assembly and the outer conductor of a gas insulated transmission line both when the transmission line is first assembled at the factory and while it is in service due to temperature differences between the outer and the inner conductors. The temperature changes may be due to changes in the continuous current and in the ambient temperature the gas-insulated transmission line is operating in.

Previous gas-insulated transmission lines utilized a skid contact member located at the end of the insulator and motion occurred between the skid and the tubular outer sheath. The motion between the skid and the outer sheath may produce particles which reduce the voltage withstand ability of the gas-insulated transmission line. In order to eliminate the production of particles, a roller assembly was installed in place of the skids.

A recent development for gas-insulated transmission lines uses corrugated aluminum for the outer conductor or sheath instead of the smooth elongated aluminum type used previously. The roller or skid design of previous gas-insulated transmission lines, when applied to a corrugated outer conductor or sheath, will have the disadvantages that the inner conductor/insulating means assembly will be forced to rise and fall with the corrugations and the force to obtain this axial motion upon assembly or during service will be high.

A good reliable transport means for the inner conductor/insulating means/particle trap assembly which retains the advantages of minimum production of particles and the low axial force of the previous roller design, and transports the inner conductor/insulating means/particle trap assembly axially within a corrugated sheath outer conductor without radial displacement is disclosed in concurrently filed copending U.S. patent application Ser. No. 439,247, entitled "Conductor Load Bearing Roller For A Gas-Insulated Transmission Line Having A Corrugated Outer Conductor", by W. H. Fischer and K. H. Yoon and assigned to the same assignee as the present invention. While the transport means disclosed in this patent application provides for axial movement without radial displacement, it is possible that the transport means may bind upon insertion of the insulator/particle trap/inner conductor assembly into a corrugated outer conductor having steep slopes to the corrugations. The present application discloses a transport means providing the same excellent transport of the insulator/particle trap/inner conductor assembly axially along a corrugated outer sheath without radial displacement and having the additional desirable feature of not binding for any slope of the corrugations less than vertical.

SUMMARY OF THE INVENTION

Briefly, the present invention is a transmission line including a corrugated outer conductor, an inner conductor adapted for connection to an external energizing source and disposed interiorly within the corrugated outer conductor, means for insulatingly supporting the inner conductor within the outer conductor, and a non-binding transport means for supporting and permitting movement of the inner conductor/insulating means assembly axially along the corrugated outer conductor without radial displacement. The transport means includes two movable support means, such as skids or rollers, supported on a common pivot lever, the pivot lever being rotatable about a pivot lever axis. The support means are separated axially a distance equal to the axial distance between the peaks and valleys of the corrugations of the outer conductor and separated radially a distance equal to the radial distance between the peaks and valleys of the corrugations of the outer conductor. The pivot lever axis is mounted on either the outer extremity of the insulator or on the outer periphery of the particle trap if one is used. The pivot lever axis is disposed parallel to the motion of travel of the inner conductor/insulating means/particle trap assembly. The transport means according to the teachings of the invention provides the advantages that the inner conductor/insulator/particle trap assembly is permitted axial movement without radial displacement within the outer corrugated conductor and in addition will not bind for any slope of the corrugations of the outer conductor less than vertical. This provides for trouble free movement within the transmission line for ease of assembly, for relative movement between the inner conductor/insulator/particle trap assembly and the outer conductor due to temperature differences during service and for ease of removal of the inner conductor/particle trap/insulating means assembly for routine maintenance.

BRIEF DESCRIPTION OF THE DRAWINGS

The invention may be understood and further advantages and uses thereof more readily appreciated when considered in view of the following detailed description of the exemplary embodiments, taken with the accompanying drawings, in which.

DETAILED DESCRIPTION

Figure 1:
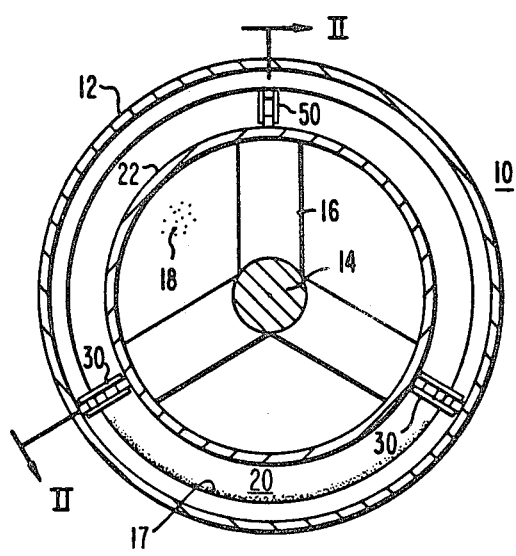
FIG. 1 is a cross-sectional view of a gas-insulated transmission line constructed according to the teachings of the invention.
Figure 2:
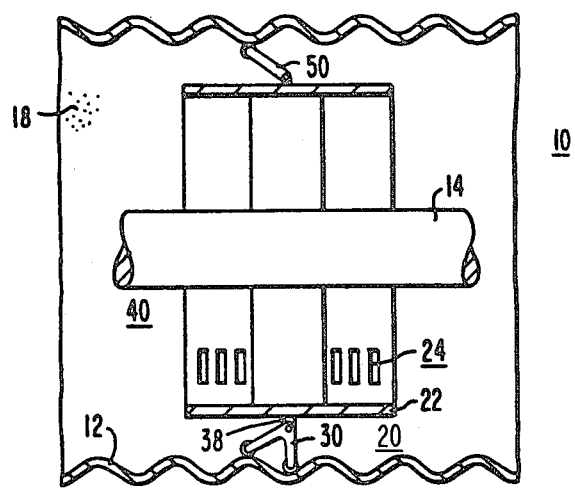
FIG. 2 is a longitudinal cross-sectional view taken along the lines II—II of FIG. 1.

Referring now to the drawings and to FIGS. 1 and 2 in particular, there are shown vertical and longitudinal cross-sectional views, respectively, of a gas-insulated transmission line constructed according to the teachings of the invention forming the subject matter disclosed and claimed in W. H. Fischer and K. H. Yoon application Ser. No. 439,247 filed Nov. 4, 1982. Gas-insulated transmission line 10 includes an elongated, corrugated cylindrical outer sheath or outer conductor 12, and an elongated inner conductor 14 disposed within, and spaced apart from, the corrugated outer conductor 12. The outer sheath or outer conductor 12 will typically be at low or ground electrical potential, whereas the inner conductor 14 will be at high electrical potential with respect to the outer sheath 12, and may typically carry voltages in the range 138–1200 KV. Insulatably supporting the inner conductor 14 within the outer sheath or outer conductor 12 are a plurality of supporting insulators 16, and electrically insulating the inner conductor 14 from the outer conductor 12 is an insulating gas 18, typical of which is sulphur hexafluoride, at pressures of approximately 50 pounds per square inch gage. Support insulator 16 is illustrated as a tripost design, although alternate support insulators may be used such as for example, disc or conically shaped, as will be more fully appreciated later. Providing low field regions 20 adjacent to the insulating spacers 16 are particle trapping rings 22 having apertures 24 to facilitate entry of particles into the low field regions 20. The inner conductor 14, the outer conductor or outer sheath 12, and the particle-trapping rings 22 will typically be of good electrically conducting material such as aluminum.

During assembly of the transmission line, as well as during expansion or contraction of the inner and outer conductors, it is important to minimize particle generation within the transmission line. Movement of the inner conductor/insulator/particle trapping means assembly within a corrugated outer conductor poses significant problems which the transport means 30 overcomes. Transport means 30 supports and permits axial movement without radial displacement of the inner conductor/insulator/particle trap assembly 40 along corrugated outer conductor 12. Referring again now to FIG. 1, transport means 30 would be disposed near the bottom of gas-insulated transmission line 10 along the periphery of support insulator 16 or particle trap 22, and for stability, it would be beneficial to dispose two transport means 30 separated radially a predetermined amount. Since FIG. 1 illustrates a tripost insulator, it would be consistent to dispose the transport means 30 proximate the lower ends of the tripost insulator thereby separating them by 120°, although this is not necessary. Since transport means 30 is disposed on particle trap 22 by means of support arm 38, it can be recognized that transport means 30 may be located and/or separated anywhere along the bottom periphery of particle trap 22 that promotes stability or it may be mounted directly on the outer periphery of an insulator if a particle trap is not used or not located at the desired position. If an adhesive such as, for example, PLIOBOND, or the polyvinyl copolymers or thermosetting epoxy resin materials described in U.S. Pat. No. 3,911,937 or U.S. Pat. No. 4,327,243 is to be used at the base of outer corrugated conductor 12, it will be located to the center of the two transport means 30 as shown generally in FIG. 1 at 17. Referring again now to FIG. 1, there is shown generally at 50 at the top of particle trap 22 a contact means for keeping an electrical continuity between the corrugated outer conductor 12 and the particle trap 22 regardless of the position of the particle trap relative to the corrugations of the corrugated outer conductor 12 as more fully described in concurrently filed copending applications "Particle Trap To Sheath Contact For A Gas-Insulated Transmission Line Having A Corrugated Outer Conductor", Ser. No. 439,246 by W. H. Fischer, K. H. Yoon and A. H. Cookson and "Particle Trap To Sheath Non-Binding Contact For A Gas-Insulated Transmission Line Having A Corrugated Outer Conductor", Ser. No. 439,245 by W. H. Fischer, both assigned to the same assignee as the present invention.

Figure 3:
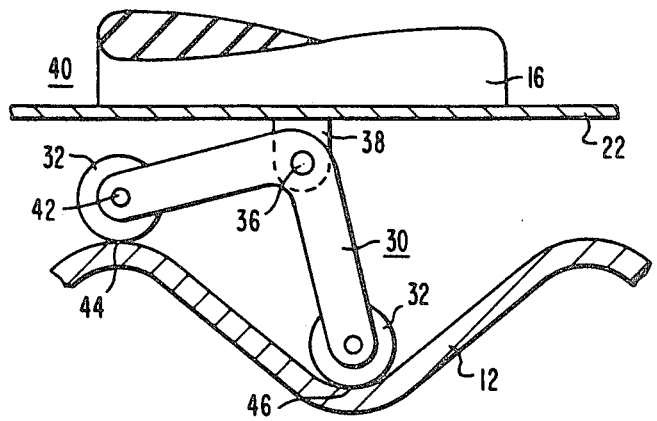
FIG. 3 is an enlarged view of a portion of an insulator particle trap, corrugated outer conductor, and transport means for supporting and permitting movement of the inner conductor/insulating means assembly axially along the corrugated outer conductor without radial displacement according to the teachings of the invention forming the subject matter disclosed and claimed in W. H. Fischer and K. H. Yoon application Ser. No. 439,247 filed Nov. 4, 1982.

Referring now to FIG. 3 transport means 30 includes two movable support means 32, which may be for example skids or preferably nonmetallic rollers so as to prevent the generation of conducting particles, disposed on the ends of pivot lever 34, which pivot lever 34 is rotatably mounted at the midpoint on pivot pin 36 which pivot pin 36 in turn is disposed on support arm 38. Rollers 32 are rotatably disposed on pivot lever 34 by means of roller bearings 42 and pivot lever 34 is designed such that rollers 32 are separated axially a predetermined distance equal to the distance between the peaks and valleys 44, 46 respectively of outer conductor 12. Rollers 32 are separated radially a second predetermined distance equal to the radial distance between the peaks and valleys 44, 46 respectively, of outer conductor 12. Since pivot lever 34 rotates at its midpoint around pivot pin 36, inner conductor/insulator/particle trap assembly 40 is longitudinally transported within corrugated outer conductor 12 without radial displacement.

Figure 4:
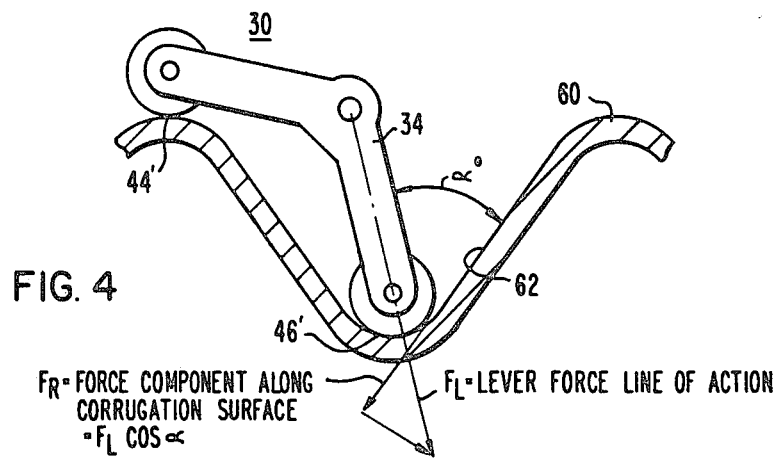
FIG. 4 is a transport means constructed according to the teachings of the invention forming the subject matter disclosed and claimed in W. H. Fischer and K. H. Yoon application Ser. No. 439,247 filed Nov. 4, 1982 along with portions of a corrugated outer conductor having steeper sloped corrugations than in FIG. 3 and the force components that result when the transport means is urged along the corrugated outer conductor.
Figure 5:
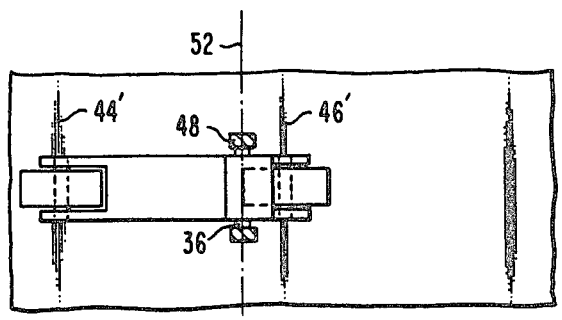
FIG. 5 is a top view of the transport means and corrugated outer conductor of FIG. 4 showing in detail the pivot lever axis, pivot pin and pivot pin bearings of the transport means which are disposed perpendicular to the line of motion of the inner conductor/insulator assembly.

The transport means 30 illustrated in FIGS. 1, 2 and 3 is economical to produce and functions well on corrugated outer conductors having corrugations with gradual slopes. However, as illustrated in FIGS. 4 and 5, a corrugated outer conductor such as corrugated outer conductor 60 having peaks 44' and valleys 46' with steep slope sides such as sloped side 62 may result in a force component along the corrugation surface opposite of the direction of travel of the transport means such as transport means 30 when the angle "α" between the pivot lever 34 and the slope of the corrugation (angle α in FIG. 4) is less than 90°. Fr is zero when angle α is equal to 90°. Therefore the transport means will bind when α is less than 90° and may bind when α=90°. This is so because the force component along the corrugation FR is equal to FL the lever force along the line of action times the cosine of the angle between the pivot lever and the corrugation slope. As illustrated more clearly in FIG. 5, a top view of transport means 30, the pivot pin 36 and pivot pin bearings 48 are disposed along a pivot pin axis 52 that is perpendicular to the roller motion or the movement of the inner conductor/insulator/particle trap assembly. The possible binding of the transport means such as transport means 30 under these conditions is eliminated by means of the instant invention illustrated in FIGS. 6 and 7.

Figure 7:
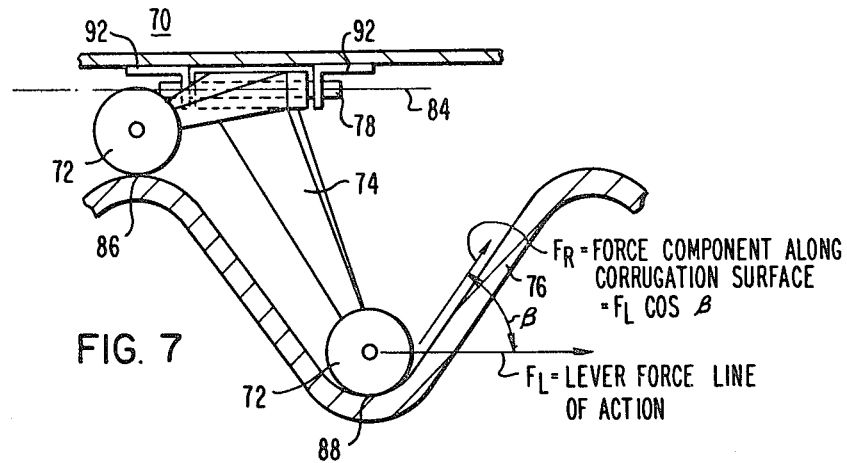
FIG. 7 is a side view of the transport means and corrugated outer conductor of FIG. 6 showing the force components resulting from urging the transport means of the invention and the inner conductor/insulator assembly along the corrugated outer conductor.
Figure 6:
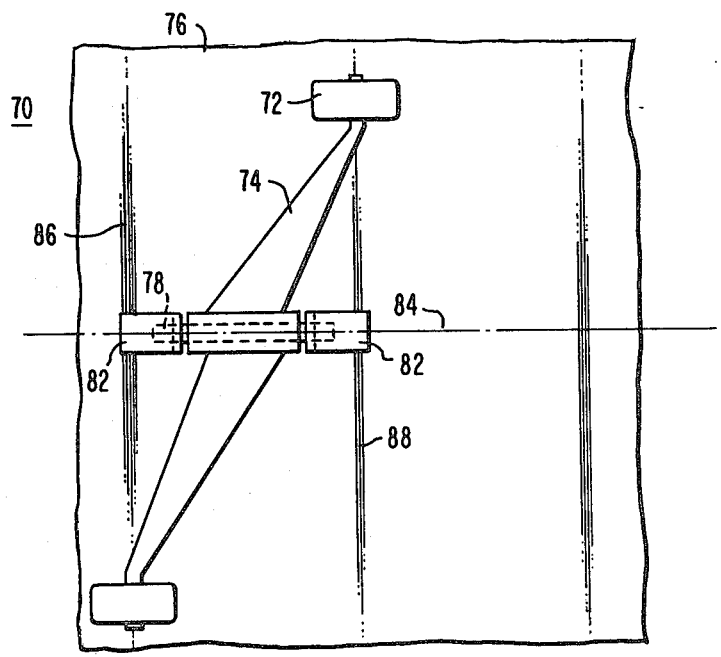
FIG. 6 is a top view of a portion of a corrugated outer conductor and another transport means constructed according to the teachings of the invention, this time having the pivot lever axis disposed parallel to the roller motion or the line of motion of the inner conductor/insulator assembly.

Transport means 70 illustrated in FIGS. 6 and 7 includes two rollers 72 rotatably disposed on the ends of pivot lever 74 which separates rollers 72 a predetermined axial distance equal to the distance between the peaks and valleys 86, 88 respectively, of the corrugated outer conductor 76 and separates rollers 72 radially a predetermined distance equal to the radial distance between the peaks and valleys 86, 88 respectively, of outer corrugated conductor 76. Pivot lever 74 is disposed on a particle trap or peripheral surface of an insulator by means of support arms 92 and pivot pin 78 rotatably connecting pivot lever 74 to pivot bearings 82 along pivot pin axis 84. Transport means 70 or two or more transport means 70 are disposed at predetermined locations along the peripheral surface of an insulator/inner-conductor/particle trap assembly. The axial and radial separation of the rollers 72 by pivot lever 74, equal to the distance equal to the axial and radial distance respectively between the peaks and valleys 86, 88 respectively, of the corrugated outer conductor 76, is designed such that there is no rise or fall of the conductor/insulator/particle trap assembly as such assembly moves axially within corrugated outer conductor 76. As one roller moves up the side of one corrugation, the other roller moves an equal amount down the adjacent corrugation, thereby keeping the pivot point, pivot pin 78, on a constant radial level. In the position shown in FIGS. 6 and 7, one roller is disposed in a valley of corrugated conductor 76 and the other is at a crest or peak of the corrugated outer conductor 76; however, this illustration is for convenience only and could have been illustrated in any position along the corrugations. Since there is no rise or fall of the conductor/insulator/particle trap assembly and there is only rolling friction on rollers 72, the force produced when motion occurs will be very low. This will result in low assembly forces and low stresses on the insulator while generating only a minimum amount of particles.

Referring now to FIG. 7, there is shown a force diagram for transport means 70 illustrating that the force component along the corrugated surface FR would be positive for any angle $\beta$ up to 90° since $FR = FL \cos \beta$. When $\beta$ is equal to 90°, of course, the slope of the corrugation would be vertical which condition would never occur in practice. Therefore, the force component FR along the corrugated surface would always be positive for transport means 70. The key design element of this invention is, of course, that the pivot lever axis 84 is in line with the roller motion or in line with the motion of the inner conductor/insulator/particle trap assembly. Because of this, the line of force on the roller is in a horizontal direction parallel to the roller or inner conductor motion which provides for a non-binding transport means.

In conclusion, there has been disclosed a unique, simple, low cost transport means that can be used with a corrugated sheath or corrugated outer conductor of a gas insulated transmission line. The invention provides for a non-binding transport of the inner conductor/insulator/particle trap assembly for any slope other than vertical of the corrugated outer conductor or corrugated sheath. The inner conductor/particle trap/insulator assembly may be moved axially within an outer corrugated conductor without radial displacement and with minimum particle generation due to the transport means of either invention.

I claim:

1. A gas-insulated transmission line, comprising:
   (A) a corrugated outer conductor having an inner surface and corrugations;
   (B) an inner conductor adapted for connection to an energizing source and disposed interiorly within said outer conductor;
   (C) an insulating gas disposed within the space between said outer and inner conductors;
   (D) insulating means disposed between said outer and inner conductors for insulatingly supporting said inner conductor within said outer conductor; and
   (E) two movable support means supported on a common pivot lever, said pivot lever being rotatable about a pivot lever axis disposed parallel to the direction of travel of the inner conductor/insulating means assembly, said two movable support means being separated axially generally by a distance equal to the axial distance between the peaks and valleys of the corrugations and separated radially generally by a predetermined distance equal to the radial distance between the peaks and valleys of the corrugations, said pivot lever axis being disposed in cooperation with said insulating means and said movable support means being disposed in movable cooperation with said inner surface of said corrugated outer conductor for permitting axial movement of said inner conductor relative to said corrugated outer conductor without permitting substantial radial displacement of said inner conductor relative to said corrugated outer conductor.

2. The gas-insulated transmission line of claim 1 wherein the movable support means are nonmetallic rollers and said rollers are rotatably disposed on the ends of said pivot lever, said pivot lever axis being located equidistant from the ends of said pivot lever.

* * * * *